UNITED STATES PATENT OFFICE 2,054,489

AZODYESTUFFS CONTAINING CHROMIUM

Richard Stüsser, Cologne-Deutz, Germany, assignor to General Aniline Works, Inc., New York, N. Y., a corporation of Delaware No Drawing. Application January 27, 1933, Serial No. 653,927. In Germany February 2, 1932

2 Claims. (Cl. 260—12)

The present invention relates to new azodyestuffs containing chromium in a complex form and to intermediate products used in the manufacture of the said dyestuffs, more particularly it relates to azodyestuffs which are derived from the 4-amino-1-hydroxybenzene-2-carboxylic acid and its nuclear substitution products as diazotization components.

The 4-amino-1-hydroxybenzene-2-carboxylic acid and its nuclear substitution products yield diazo compounds which can be coupled with coupling components suitable for producing azodyestuffs. The energy for coupling of these diazo compounds, however, is so low that they only do couple with components easily coupling. Thus, for example, up to the present it is not possible at all or only difficultly possible to couple the diazo compounds of 4-amino-1-hydroxybenzene-2-carboxylic acids with 2-hydroxynaphthalene-6,8-disulfonic acid, with 2-hydroxynaphthalene-4,8-disulfonic acid or with 2-hydroxynaphthalene-3,6-disulfonic acid, or with 2-hydroxynaphthalene-8-sulfonic acid, with salicylic acid or with cresotinic acid.

Now I have found that the energy of coupling diazo-compounds of 4-amino-1-hydroxybenzene-2-carboxylic acid and its nuclear substitution products is highly increased when diazotizing complex chromium compounds of the same, which complex compounds can be diazotized in the usual manner and coupled with coupling components suitable for producing azodyestuffs.

It is one feature of my invention to produce chromium complex compounds of 4-amino-1-hydroxybenzene-2-carboxylic acids and of its nuclear substitution products, such as alkyl-, alkoxy-, nitro-, halogen- and sulfonic acid substitution products. These new complex compounds may be represented by the probable general formula:

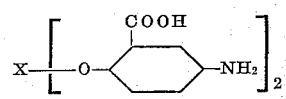

wherein X stands for the group

or

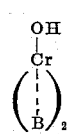

in which latter group B stands for a non-diazotizable organic base, wherein those compounds containing the base in the molecule may besides contain water in their molecule, and wherein the benzene nucleus may bear further substituents, such as alkyl-, alkoxy-, the nitro group, halogen and the sulfonic acid group.

As non-diazotizable bases which may be present in my new complex compounds there may be mentioned by way of example primary, secondary and tertiary aliphatic bases and secondary and tertiary aromatic bases, such as ethylenediamine, dibutylamine, piperidine, tributylamine, ethylaniline, dimethylaniline, pyridine and quinoline.

The complex chromium compounds of the type:

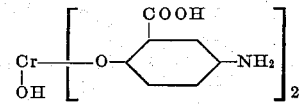

are obtainable by heating, for example, by refluxing, the 4-amino-1-hydroxybenzene-2-carboxylic acids in the free form or in form of a water-soluble salt, especially an alkali metal salt, with a water-soluble chromium salt, containing chromium in the trivalent form, such as chromium chloride, chromium fluoride, chromium sulfate, chromium acetate, chromium formate, in water or in an organic solvent, such as alcohol, or in a mixture of water and organic solvent, such as water + alcohol.

The quantity of the chromium salt required for producing the new chromium complex compounds corresponds to ½ molecular equivalent for 1 molecular proportion of the 4-amino-1-hydroxybenzene-2-carboxylic acid. However, it should be mentioned that the process can be performed with excess chromium salt or with less than the theoretical quantity, in the former case the excess chromium remaining in the reaction mass, while in the latter case only part of the 4-amino-1-hydroxybenzene-2-carboxylic acid being transformed into the chromium complex compound.

From the reaction mass the complex compounds either wholly or partially separate in form of their salts as yellowish to grey to brownish powders, or they remain in solution, in which latter case their solutions can be used directly in the manufacture of azodyestuffs.

Those chromium complex compounds containing a non-diazotizable organic base in the molecule are obtainable by treating the 4-amino-1-hydroxybenzene-2-carboxylic acids or a water-soluble salt thereof in water or in an organic medium, such as alcohol, or in an aqueous organic medium, with a chromium salt of the kind referred to above and with the addition of a non-diazotizable base. Favorably the reaction is carried out with the application of heat, for example, by refluxing. However, the reaction may also be carried out at room temperature, for example, by stirring at room temperature for a prolonged time, say for several days.

In carrying out the invention care is to be taken that for one molecular proportion of 4-amino-1-hydroxybenzene-2-carboxylic acid at least 1 molecular proportion of the non-diazotizable base is present, generally, however, I am working with an excess of the non-diazotizable base.

The quantity of the chromium salt required corresponds to that used in the manufacture of the complex compounds free from the base.

From the reaction mass the new chromium complex compounds containing chromium and a non-diazotizable base either wholly or partially separate in a crystalline form, or remain in solution.

Those complex compounds free from water are in form of their alkali metal salts generally yellowish to brown substances, while those containing water generally are obtained in form of colorless to violet to weakly brownish substances.

From my present knowledge I cannot say that the constitution as stated above of the new complex compounds is correct; from the analysis of the chromium-pyridine-complex compounds of 4 - amino - 1 - hydroxybenzene-2-carboxylic acid however, it may be concluded that these compounds correspond to the formulae:

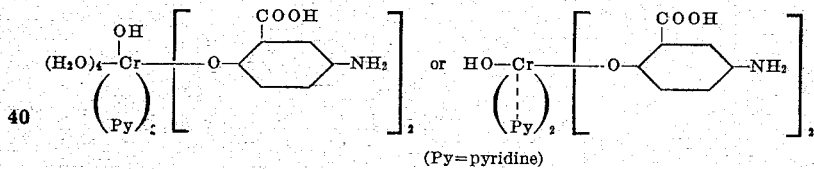

(Py=pyridine)

respectively, from which the general formulas disclosed above would result.

From my new complex compounds azodyestuffs are obtainable by tetrazotizing the same in the usual manner and coupling with two molecular proportions of a coupling component suitable for producing an azodyestuff. The new dyestuffs which may be represented by the probable general formula:

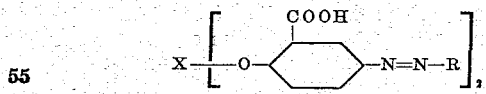

wherein X stands for the group

in which latter group B stands for a non-diazotizable organic base, and wherein R stands for the radical of a coupling component suitable for producing an azodyestuff, are in form of their alkali metal salts generally water-soluble substances.

The shades obtained with the dyestuffs vary from yellow to red to violet to blue to black, depending upon the specific coupling components and specific substituents present in the diazotization component used.

By treating the new dyestuffs in solution with a caustic alkali or with a strong acid, such as hydrochloric acid or sulfuric acid, or formic acid or oxalic acid, the chromium or the base and the chromium respectively are removed from the dyestuffs, it being mentioned that the base is more easily split off than the chromium, and that therefore from the dyestuffs containing chromium and base also the dyestuffs containing chromium are obtainable.

By splitting off the chromium or the chromium and the base, one molecule of the dyestuff of the formula:

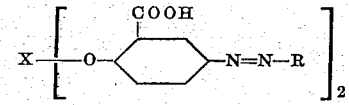

wherein X means the same as above yields two molecules of a dyestuff of the formula:

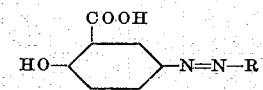

The invention is illustrated by the following examples, without being limited thereto:

*Example 1.*—230 grams of 4-amino-1-hydroxybenzene-2-carboxylic acid are refluxed for about three hours in 500 ccs. of water with 250 ccs. of pyridine and 250 grams of an aqueous chromium chloride solution of a strength corresponding to 270 grams of $Cr_2O_3$ in one liter. During the reaction a brownish-violet chromium-pyridine compound of the 4-amino-1-hydroxybenzene-2-carboxylic acid separates. When the reaction is complete, the new complex compound is filtered with suction, washed with water and dried. It is a crystalline substance of the molecular formula: $C_{24}H_{31}N_4O_{11}Cr$, and probably has the following constitution:

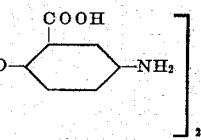

It can be diazotized in the usual manner, for example, with sodium nitrite and hydrochloric or sulfuric acid, yielding a reddish-brown crystalline diazo compound, easily soluble in water and coupling with coupling components to form azodyestuffs. The energy of coupling is highly increased compared with that of diazotized 4-amino-1-hydroxybenzene-2-carboxylic acid.

When working in the same manner but without the addition of an organic base, there is obtained a grey chromium complex compound, probably corresponding to the following formula:

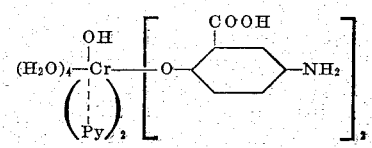

*Example 2.*—230 grams of 4-amino-1-hydroxybenzene-2-carboxylic acid are refluxed for about 2 hours in 500 ccs. of water with 400 ccs. of pyridine and 230 ccs. of aqueous chromium sulfate solution of a strength corresponding to 290 grams of Cr$_2$O$_3$ in one liter. In the course of the reaction, a yellow substance separates, which is filtered with suction and dried after the reaction is complete. The yellow substance is the chromium pyridine complex compound of the 4-amino-1-hydroxybenzene-2-carboxylic acid and probably corresponds to the following formula:

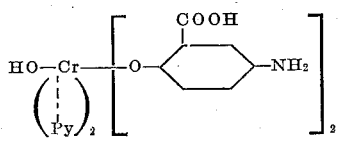

It is difficultly soluble in water, easily soluble in aqueous soda solution or in aqueous ammonia. It can be diazotized in the usual manner yielding a red brown crystalline diazo compound, which is easily soluble in water and couples with coupling components to form azodyestuffs.

*Example 3.*—30 grams of 4-amino-6-methyl-1-hydroxybenzene-2-carboxylic acid are refluxed for about 3 hours in 40 ccs. of water with 40 ccs. of pyridine and 21 ccs. of an aqueous chromium chloride solution of a strength corresponding to 270 grams of Cr$_2$O$_3$ in one liter. In the course of the reaction a brownish crystalline mass separates. When the reaction is complete, the complex compound formed is filtered with suction, washed with water and dried. It has properties similar to those of the substance obtainable in accordance with Example 1.

*Example 4.*—35 grams of 6-sulfo-4-amino-1-hydroxybenzene-2-carboxylic acid are refluxed for about 3 hours in 50 ccs. of water with 30 ccs. of triethanolamine and 21 ccs. of an aqueous chromium sulfate solution of a strength corresponding to 290 grams of Cr$_2$O$_3$ in one liter. When the reaction is complete, the reaction mixture is allowed to cool, and the chromium triethanolamine complex of 6-sulfo-4-amino-1-hydroxybenzene-2-carboxylic acid compound formed is precipitated by salting out. After filtering and drying it is obtained as a greenish-grey substance, soluble in water and which can be diazotized in the usual manner.

*Example 5.*—1 grammolecular proportion of the complex chromium pyridine compound of 4-amino-1-hydroxybenzene-2-carboxylic acid, prepared according to Example 1, is covered with a mixture of 750 grams of glacial acetic acid and 200 grams of hydrochloric acid of 22° Bé. strength, and the complex compound is diazotized by adding thereto 700 ccs. of a 10% aqueous sodium nitrite solution, the temperature thereby being maintained at about 5° C. When the diazotization is complete, some ice is added and the mass is slowly introduced into a solution containing ice prepared from two grammolecular proportions of salicylic acid and 480 grams of caustic soda, 950 grams of an aqueous caustic soda lye of 38° Bé. strength being simultaneously added and care being taken that during the whole coupling ice is present in the reaction mixture and that the solution reacts caustic alkaline during the whole process. The formation of the dyestuff immediately begins and is soon complete. When the diazo compound is no more detectable, hydrochloric acid is added in order to neutralize the caustic soda. The chromium compound of the dyestuff which has been precipitated by the addition of the hydrochloric acid and which probably corresponds to the following formula:

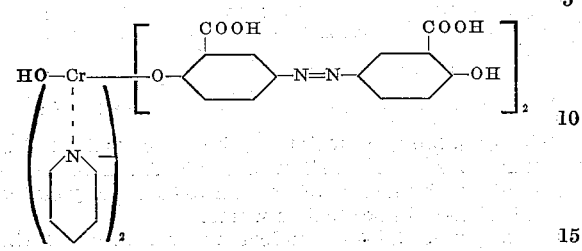

is filtered with suction and dried. It dyes wool light yellow shades which by after-chroming becomes more red and more powerful. The after-chromed shades are very fast to fulling.

*Example 6.*—The dyestuff obtained by coupling one molecular proportion of the diazotized complex chromium-dimethylaniline compound of 4-amino-1-hydroxybenzene-2-carboxylic acid and two molecular proportions of 6-methyl-1-hydroxybenzene-2-carboxylic acid and having in its free state probably the following formula:

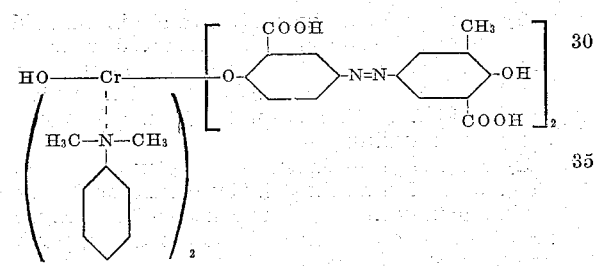

dyes wool yellow shades which by after-chroming become deeper and fast to fulling.

*Example 7.*—One molecular proportion of the complex chromium pyridine compound obtained in accordance with Example 1, is diazotized as described in Example 5, and coupled in aqueous soda solution with two molecular proportions of 2-hydroxynaphthalene-8-sulfonic acid. The coupling is soon complete, the azodyestuff formed is salted out, filtered and dried. It is a dark powder, soluble in water with a red coloration, dyeing wool yellowish shades. In its free state it probably has the following formula:

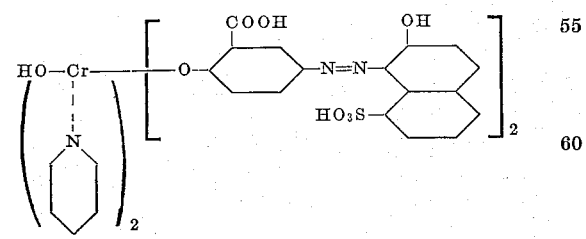

A dyestuff having similar properties is obtained when substituting the chromium pyridine complex compound by the corresponding chromium triethanolamine complex compound.

*Example 8.*—By coupling one molecular proportion of the diazotized chromium complex compound, obtainable by refluxing 4-amino-1-hydroxybenzene-2-carboxylic acid with chromium chloride in water with the addition of sodium acetate, with two molecular proportions of 2- hydroxynaphthalene-3,6-disulfonic acid, there is obtained a dyestuff of the probable formula:

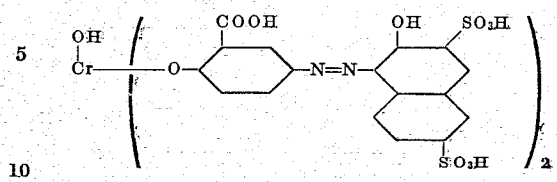

being soluble in water, dyeing wool red shades. The dyestuff is further suitable for being precipitated by means of barium carbonate, yielding a bluish-red lake fast to water.

*Example 9.*—One molecular proportion of the complex chromium compound prepared in accordance with Example 4 from 4-amino-1-hydroxybenzene-2-carboxylic acid-6-sulfonic acid is diazotized and coupled in aqueous caustic soda solution with two molecular proportions of salicylic acid. The azodyestuff separated corresponds in its free state to the probable formula:

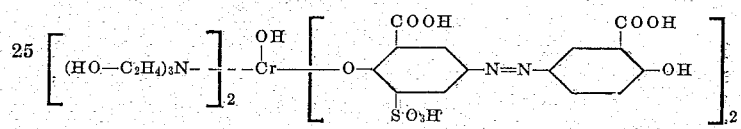

By treating the azodyestuff with a mineral acid the base and the chromium are removed from the dyestuff. The dyestuff free from chromium and the base thus obtained dyes wool light yellow shades which by after-chroming yield a clear yellow fast to fulling.

By coupling the diazotized complex chromium compound of 4-amino-1-hydroxybenzene-2-carboxylic acid with 1-hydroxybenzene-2-carboxylic acid-6-sulfonic acid there is obtained a dyestuff having similar properties.

Besides the coupling components used in the preceding examples other coupling components can be used, such as amino- and diamino-benzenes, hydroxy- and diaminonaphthalenes, hyphenols, amino- and diaminonaphthalenes, hydroxy- and dihydroxynaphthalenes, aminonaphthols, amino- and hydroxy-carbazoles and coupling components containing a methylene group with a reactive hydrogen atom, such as pyrazolones, acylacetic acid arylamides methylketol and the like.

If the dyestuffs obtained in accordance with my invention still contain a diazotizable amino group the new azodyestuffs can be further diazotized and coupled with coupling components.

I claim:

1. The azodyestuffs of the general formula:

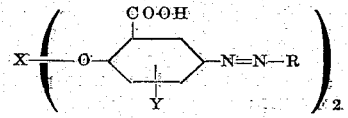

wherein X stands for one of the groups

and

in which latter group B stands for a non-diazotizable organic base, wherein R stands for the radical of a coupling component suitable for producing azodyestuffs and wherein Y stands for a member of the group consisting of hydrogen, alkyl, alkoxy, nitro, halogen and the sulfonic acid group.

2. The azodyestuffs of the general formula:

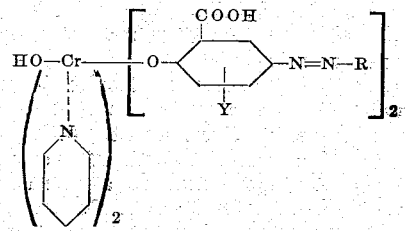

wherein R stands for the radical of a coupling component suitable for producing azodyestuffs and wherein Y stands for a member of the group consisting of hydrogen, alkyl, alkoxy, nitro, halogen and the sulfonic acid groups.

RICHARD STÜSSER.